Patented Jan. 12, 1932

1,841,055

UNITED STATES PATENT OFFICE

WALTER REPPE AND ULRICH HOFFMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF UNSATURATED HYDROCARBONS

No Drawing. Application filed November 28, 1928, Serial No. 321,506, and in Germany December 2, 1927.

Only unsatisfactory yields of unsaturated hydrocarbons, in particular of diolefines, have hitherto been obtained by the catalytic dehydration of the corresponding hydroxy and polyhydroxy compounds, hereinafter referred to as hydroxylated hydrocarbons, for example, glycols containing at least four carbon atoms in the molecule, because, in most cases the formation of the unsaturated hydrocarbons is accompanied to a greater or smaller extent, by undesirable secondary reactions which, in addition to considerably diminishing the yield of unsaturated hydrocarbons, carbonize and clog the catalysts and so render them inactive after a short time.

These drawbacks are overcome and excellent results are obtained both as regards yield and the length of service of the catalysts, if use be made of catalysts consisting of or containing such salts of the oxygen acids of phosphorus as have an acid reaction under the conditions of working, as, for example, by hydrolysis or dissociation. These substances include not only the so-called acid salts of the various phosphorus acids, but also such neutral salts (i. e. those salts in which all the hydrogen atoms capable of forming ions of the corresponding acid of phosphorus are replaced by a metal or metals), as, for example, neutral alkaline earth phosphates, such as tricalcium phosphate as have an acid reaction under the conditions of the reaction. Aluminium phosphate, however, is unsuitable, since it has a powerful condensing effect at the same time and would furnish products which are not desired. Tertiary sodium phosphate also cannot be used at the temperatures which come under consideration in practice, since it is a salt having a basic reaction. By a suitable choice of the acids and partial or complete substitution of the replaceable hydrogen atoms by light or heavy metals or by groups of inorganic atoms, catalysts may be obtained which are suitable for each individual case of dehydration and can be favorably employed for the exclusive or predominant production of unsaturated hydrocarbons, at the same time preventing undesirable secondary reactions, such as the formation of ethers, esters, aldehydes, ketones, oxids and the like. The catalysts may be prepared in any known and suitable manner as, for example, from the acids of phosphorus and the oxids, hydroxids, carbonates and the like, of light or heavy metals, or by the precipitation of soluble salts of these acids by means of metallic salts, well-defined hydrogen-ion concentrations being preferably maintained. In many instances it is advantageous to employ mixtures of different salts, such as primary initial material and on the phosphatic salts and the like, the relative proportions of the mixtures being variable within wide limits. The catalysts may be used, as such, after a preliminary pressing and moulding, or deposited on carriers or mixed with carrier substances such as pumice, graphite, bleaching earths such as fuller's earth and the like.

We have found that the process herein described can be carried out, with particularly good effect and, at the same time with increased length of service of the catalysts, when small amounts of free acids, which, as a rule, are not volatile under the conditions of working, such as phosphoric acid, are incorporated with the catalysts. In place of the said free acids such substances as supply free acids under the conditions of working, as, for example, ammonium phosphates, the phosphates of organic amines, acid esters and the like may also be employed. The preparation of the catalysts may be conducted, for example, by effecting the precipitation or crystallization of the salts in an acid solution, such as a solution in phosphoric acid, in which case, given a suitable concentration of the acid during the precipitation or crystallization, salts with a definite small content of free acid can be obtained.

The most suitable amount of acid to be incorporated with the catalyst depends on the initial material and on the phosphatic salts employed as catalysts in each case, the amount being usually not more than 6 per cent and preferably between 2 and 4 per cent of free acid, or the equivalent amount of a substance supplying such acids, in reference to the solid substance of the catalyst, free from water of crystallization. With higher concentrations of free acids, the yield of unsaturated hydrocarbons usually decreases again, to sink, finally, to the effect caused by the free acids alone, for example phosphoric acid on carriers, such as pumice, graphite or carborundum. By varying the method of preparing the catalysts, for example, by precipitation or crystallization under different conditions of concentration or temperature, or of the rate of precipitation or crystallization, salts may be obtained with extensive graduations in respect of their content of free acid, such as may be desirable for the various purposes in view.

The dehydration of the hydroxylated hydrocarbons may be effected under ordinary, reduced or elevated pressure, and is carried out in the vaporous or gaseous state. The contact salts may also be employed in the fused state. Although it is advisable that the reaction should be conducted under low pressures, elevated pressures may, nevertheless, be advantageous under certain circumstances, and more especially when the product to be recovered is gaseous and when it is desired to obtain it in liquid form. The operation may be carried out in the presence or absence of inert gases, and, if desired, with the introduction of water vapor or other diluents. If desired, in order to produce mixtures of certain definite unsaturated hydrocarbons, mixtures of several hydroxylated hydrocarbons, for example, of 1.3-butylene glycol with butanol may be subjected to dehydration. Again, in order to obtain products of the highest percentage strength possible, the operation may, in certain cases, be conducted so as not to complete the dehydration in a single stage, the residual unaltered initial materials being freed from the dehydrated products and the water of the reaction after issuing from the reaction chamber, and then being passed over the catalyst once more. The choice of temperature depends on the nature of the initial material and the catalysts employed and, generally speaking, is between 150° and 500° C. According to their physical behaviour the unsaturated hydrocarbons issuing from the reaction chamber are either condensed together with the water formed in the reaction, in a condenser, and then separated from the said water, as, for example, in the case of cyclohexene, or they are freed from water in a condenser at ordinary temperature and then liquefied by compression in the usual manner, as, for example, in the case of butadiene, or are led to a gas holder for other uses, as, for example, in the case of ethylene.

In particular unsaturated hydrocarbons of the aliphatic and hydroaromatic series can be produced according to this invention.

The catalyst with which free acids have been incorporated are specially applicable in cases where high molecular, polyvalent alcohols are to be converted into unsaturated hydrocarbons.

The following examples will further illustrate the nature of the said invention which, however, is not limited thereto.

Example 1

An aqueous solution of primary sodium phosphate, or an aqueous solution of equimolecular quantities of phosphoric acid and caustic soda solution, just giving a yellow color reaction with methyl orange as indicated, is treated with an addition of such an amount of phosphoric acid that the solution contains 8 per cent of free phosphoric acid with reference to the anhydrous primary sodium phosphate. The solution is concentrated, on the water bath or in vacuo, until 1 cubic centimeter contains about 1.1 to 1.2 grams of primary anhydrous sodium phosphate. It is then cooled down to 70° C., allowed to crystallize at that temperature, and centrifuged or filtered by suction. The resulting primary sodium phosphate, which contains about 2 per cent of free phosphoric acid in addition to about 9 per cent of water of crystallization is ground along with 20 per cent of powdered graphite and pressed into moulds.

After being introduced into the contact chamber, this catalyst is dehydrated, in a current of inert gas, such as nitrogen, air or carbon dioxid, passed through at such a rate as to refill the contact chamber about 5 to 10 times per minute, the initial temperature being 60° to 80° C. slowly rising to 150° C., and finishing off at 220° C.

Over this catalyst a mixture of 80 per cent of 1.3-butyleneglycol and 20 per cent of water is passed at 270° C. and at the rate of 100 grams per hour and per liter of contact space. The yields of butadiene, with reference to butadiene of 100 per cent purity, are 85 to 90 per cent of the theoretical.

A catalyst of similar efficiency and composition is obtained by preparing, in the manner herein described, a sodium phosphate solution containing about 3 to 4 per cent of free phosphoric acid and 1.1 to 1.2 grams of monosodium phosphate, allowing it to crystallize in the cold and drying the salt to the desired water content, about 9 per cent, in a current of air, and then dehydrating in the manner hereinbefore described.

A very excellent catalyst may also be obtained by pressing acid sodium pyrophosphate into moulds and then spraying a suspension of pulverized graphite in dilute phosphoric acid onto the surface of the moulded product at a temperature of about 80° C. In this manner a catalyst is obtained, containing about 10 parts of graphite and about 5 parts of free phosphoric acid for each 100 parts of the catalyst, which may then be further treated in the manner hereinbefore described.

Example 2

100 parts of secondary calcium phosphate are made up into a stiff paste together with 10 parts of secondary ammonium phosphate, 40 parts of water and 10 parts of graphite, which has been boiled out with hydrochloric acid and washed, and the said paste is passed through an extrusion press. The granules, which are obtained from the paste, after drying and breaking up, are employed in the manner described above for the production of butadiene from 1-3-butyleneglycol. The catalyst furnishes a yield of over 90 per cent of butadiene, which is already very pure; this corresponds to an increase in yield of more than 40 per cent over that obtained when secondary calcium phosphate is employed alone with an admixture of 10 per cent of graphite.

Example 3

100 parts of anhydrous primary sodium phosphate are dissolved in 40 parts of water and mixed with 8 parts of primary n-butylamine phosphate together with 20 parts of graphite. The product is then evaporated while stirring, and the solidified mass is finally heated to a temperature of 160° C. After cooling down the mass is broken up into pieces of the desired size and is screened, and then the granules thus obtained are employed for the production of butadiene from 1.3-butyleneglycol at 260° C. and otherwise under the conditions specified above. The catalyst is distinguished by its great durability and by its maintaining its activity unchanged even when employed for a long time.

What we claim is:

1. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature in admixture with small amounts of a substance furnishing a free acid, but not including aluminium phosphate.

2. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with small amounts of a substance furnishing a free acid, non-volatile under the conditions of working, but not including aluminium phosphate.

3. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with small amounts of a free acid, non-volatile under the conditions of working, but not including aluminium phosphate.

4. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with not more than 6 per cent of a free acid, non-volatile under the conditions of working, but not including aluminium phosphate.

5. In the production of unsaturated hydrocarbons by catalytic dehydration of hydroxylated hydrocarbons, the step of passing the said initial materials in the gaseous phase, together with a diluent, and at a temperature between 150° and 450° C. over a catalyst comprising such a salt of an oxygen acid of phosphorus as has an acid reaction at the said temperature, in admixture with small amounts of a substance furnishing a free acid, non-volatile under the conditions of working, but not including aluminium phosphate.

6. In the production of unsaturated hydrocarbons by catalytic dehydration of hydroxylated hydrocarbons, the step of passing the said initial materials in the gaseous phase together with a diluent and at a temperature between 150° and 450° over a catalyst comprising such a salt of an oxygen acid of phosphorus as has an acid reaction at the said temperature, in admixture with small amounts of a substance furnishing a free acid, non-volatile under the conditions of working, but not including aluminium phosphate.

7. In the production of unsaturated hydrocarbons by catalytic dehydration of hydroxylated hydrocarbons, the step of passing the said initial materials in the gaseous phase together with water vapor and at a temperature between 150° and 450° C. over a catalyst comprising such a salt of an oxygen acid of phosphorus as has an acid reaction at the said temperature, in admixture with small amounts of a substance furnishing a free acid, non-volatile under the conditions of working, but not including aluminium phosphate.

8. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with small amounts of free phosphoric acid, but not including aluminium phosphate.

9. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with graphite, but not including aluminum phosphate.

10. The process for the production of butadiene from butylene glycol, which comprises passing the said initial material in the gaseous phase and at a temperature between 150° and 450° C. together with steam over a catalyst obtained from secondary calcium phosphate, ammonium phosphate and graphite.

11. The process for the production of butadiene from 1.3-butylene glycol which comprises passing the said initial material in the gaseous phase and at a temperature between 150° and 500° C. together with steam over a catalyst consisting of phosphoric acid, graphite and a sodium salt of an oxygen acid of phosphorus containing one atom of sodium to each atom of phosphorus in the molecule.

In testimony whereof we have hereunto set our hands.

WALTER REPPE.
ULRICH HOFFMANN.

9. In the production of unsaturated hydrocarbons by catalytic dehydration of hydroxylated hydrocarbons, the step of passing the said initial materials in the gaseous phase and at a temperature between 150° and 450° C. over a catalyst comprising such a salt of an oxygen acid of phosphorus as has an acid reaction at the said temperature, in admixture with graphite, but not including aluminum phosphate.

10. The process for the production of butadiene from butylene glycol, which comprises passing the said initial material in the gaseous phase and at a temperature between 150° and 450° C. together with steam over a catalyst obtained from secondary calcium phosphate, ammonium phosphate and graphite.

11. The process for the production of butadiene from 1.3-butylene glycol which comprises passing the said initial material in the gaseous phase and at a temperature between 150° and 500° C. together with steam over a catalyst consisting of phosphoric acid, graphite and a sodium salt of an oxygen acid of phosphorus containing one atom of sodium to each atom of phosphorus in the molecule.

In testimony whereof we have hereunto set our hands.

WALTER REPPE.
ULRICH HOFFMANN.

CERTIFICATE OF CORRECTION.

Patent No. 1,841,055.  Granted January 12, 1932, to

WALTER REPPE ET AL.

It is hereby certified that error appears in the printed specification of the above numbered patent requiring correction as follows: Page 1, line 62, strike out the words "initial material and on the phosphatic salts" and insert instead and secondary salts, different primary salts; and that the said Letters Patent should be read with this correction therein that the same may conform to the record of the case in the Patent Office.

Signed and sealed this 12th day of April, A. D. 1932.

(Seal)

M. J. Moore,
Acting Commissioner of Patents.

CERTIFICATE OF CORRECTION.

Patent No. 1,841,055.    Granted January 12, 1932, to

WALTER REPPE ET AL.

It is hereby certified that error appears in the printed specification of the above numbered patent requiring correction as follows: Page 1, line 62, strike out the words "initial material and on the phosphatic salts" and insert instead and secondary salts, different primary salts; and that the said Letters Patent should be read with this correction therein that the same may conform to the record of the case in the Patent Office.

Signed and sealed this 12th day of April, A. D. 1932.

(Seal)

M. J. Moore,
Acting Commissioner of Patents.